(12) United States Patent
Agoretti et al.

(10) Patent No.: US 10,549,493 B2
(45) Date of Patent: Feb. 4, 2020

(54) TYRE SEALANT LAYER

(71) Applicant: BRIDGESTONE CORPORATION, Tokyo (JP)

(72) Inventors: Pasquale Agoretti, Ariccia (IT); John Nazareno House, Rome (IT); Francesco Madau, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 149 days.

(21) Appl. No.: 15/572,813

(22) PCT Filed: May 13, 2016

(86) PCT No.: PCT/IB2016/052794
§ 371 (c)(1),
(2) Date: Nov. 9, 2017

(87) PCT Pub. No.: WO2016/185351
PCT Pub. Date: Nov. 24, 2016

(65) Prior Publication Data
US 2018/0141290 A1    May 24, 2018

(30) Foreign Application Priority Data
May 15, 2015    (IT) .................. 102015000015369

(51) Int. Cl.
*B29C 73/22* (2006.01)
*C08L 23/28* (2006.01)
*C08L 97/00* (2006.01)
*C08K 3/04* (2006.01)

(52) U.S. Cl.
CPC .............. *B29C 73/22* (2013.01); *C08L 23/28* (2013.01); *C08L 97/005* (2013.01); *C08K 3/04* (2013.01)

(58) Field of Classification Search
CPC ........... B29C 73/22; C08L 23/28; C08L 97/05
See application file for complete search history.

(56) References Cited

U.S. PATENT DOCUMENTS 7,064,171 B1     6/2006   Halasa et al.
2012/0073720 A1*  3/2012   Halasa ................. B60C 1/0008
                                                    152/527

FOREIGN PATENT DOCUMENTS

| EP | 2 433 813 A1 | 3/2012 |
| JP | 2014-185223 A | 10/2014 |
| WO | 01/87795 A1 | 11/2001 |
| WO | 2014/122622 A1 | 8/2014 |

OTHER PUBLICATIONS

XP-002753890, Database WPI, Week 201465, Thomson Scientific, London, GB, AN 2014-R70205, 1 page.
Written Opinion of the International Searching Authority of PCT/IB2016/052794 dated Aug. 31, 2016.
International Search Report of PCT/IB2016/052794 dated Aug. 31, 2016.

* cited by examiner

*Primary Examiner* — Edward J Cain
(74) *Attorney, Agent, or Firm* — Sughrue Mion, PLLC

(57) ABSTRACT

A compound for a tyre sealant layer comprising at least one polymer base consisting of an essentially saturated polymer and a filler, which in turn comprises kraft lignin.

8 Claims, No Drawings

TYRE SEALANT LAYER

CROSS REFERENCE TO RELATED APPLICATIONS

This application is a National Stage of Application No. PCT/IB2016/052794 filed May 13, 2016, claiming priority based on Italian Patent Application No. 102015000015369 filed May 15, 2015, the contents of all of which are incorporated herein by reference in their entirety.

TECHNICAL FIELD

The present invention concerns a compound for preparing a tyre sealant layer.

BACKGROUND ART

The use in tyres of a viscous sealant layer generally arranged in the inner cavity of the tyre in contact with the air or covered by a protective rubber or polymer layer has been known for some time. In particular, the sealant layer is generally arranged on the central zone of the inner cavity in the area of the tread strip.

The object of the sealant layer is to surround and adhere to the object that has penetrated the tread, thus preventing the outflow of air from the tyre by instant "sealing". Furthermore, if the penetrated object comes out of the tread, the material of the sealant layer will be arranged to occupy the hole left by the object sealing the same.

Part of the research into tyres concentrates on improving the effectiveness of the sealant layer with particular attention to its rheological characteristics. In fact, the viscosity of the sealant layer must guarantee both the sealing action with respect to the penetrated object and with respect to any hole as described above, and its stability in the inner cavity regardless of the static or dynamic conditions of the tyre.

As may appear evident to a person skilled in the art, the sealant layer, being constantly in contact with the pressurized air, is one of the parts of the tyre most exposed to oxidative degradation, consequently compromising its sealing capacity.

The need was therefore felt for a sealant layer, with technical characteristics such as to guarantee maintenance of its sealant properties throughout the life of the tyre.

Lignin is an organic substance which binds the cells and the fibres that make up wood and the lignified elements of plants. After cellulose, it is the most abundant renewable source of carbon on the earth. Although it is not possible to define the precise structure of lignin as a chemical molecule, lignin can be defined as a dendritic polymer based on the following three phenylpropane units: -p-coumaryl alcohol; -coniferyl alcohol (4-hydroxy-3-methoxycinnamyl alcohol); -sinapyl alcohol (4-hydroxy-3,5-dimethoxycinnamyl alcohol).

There are substantially two types of lignin on the market: sulfonate lignin and kraft lignin.

Kraft lignin is a by-product of the Kraft process, used to chemically extract cellulose from wood. It is obtained by precipitation, lowering the pH of the spent liquor of the Kraft process. For this reason kraft lignin, unlike sulfonate lignin, does not have sulfonate groups.

The inventors of the present invention have surprisingly found that the use of kraft lignin in the compound for production of the sealant layer is able to guarantee conservation of the sealing characteristics of the same during the life of the tyre.

DISCLOSURE OF INVENTION

The subject of the present invention is a compound for tyre sealant layer comprising at least one polymer base consisting of an essentially saturated polymer and a filler; said compound being characterized by the fact that said filler comprises kraft lignin.

Here and below by "essentially saturated polymer" we mean a polymer produced with less than 15% in moles of diene monomers.

Preferably, the compound for sealant layer comprises 0.5 to 40 phr, more preferably at least 5 phr, of kraft lignin.

Preferably, the filler comprises carbon black.

Preferably, the kraft lignin constitutes 0.5 to 100%, more preferably at least 10%, by weight of the whole filler.

Preferably, said polymer base consisting of an essentially saturated polymer is a halobutyl and/or butyl rubber.

A further subject of the present invention is a tyre sealant layer produced with the compound according to the present invention.

A further subject of the present invention is a tyre comprising a sealant layer produced with the compound according to the present invention.

BEST MODE FOR CARRYING OUT THE INVENTION

Some embodiment examples are given below for purely illustrative non-limiting purposes.

Three compounds were prepared (A-C), the first two of which (A and B) constitute two comparison examples, and the third (C) constitutes an example of a compound produced according to the precepts of the present invention.

In particular, the comparison compound A is relative to a compound currently used to prepare sealant layers, while the comparison compound B differs from the comparison compound A due to the fact that part of the carbon black has been replaced with sulfonate lignin.

The compound of the invention C differs from the comparison compound A due to the fact that part of the carbon black has been replaced with kraft lignin.

Basically the comparison compound B and the compound of the invention C differ only due to the type of lignin used.

Table I shows the compositions in phr of the three compounds.

TABLE I

|  | A | B | C |
|---|---|---|---|
| Br-IIR |  | 100 |  |
| Liquid p-butene |  | 350 |  |
| Carbon black | 20 | 10 | 10 |
| Sulfonate lignin | — | 10 | — |
| Kraft lignin | — | — | 10 |

Br-IIR stands for bromobutyl rubber.

The sulfonate lignin used in the examples is sold under the trade name "Borresperse NA" by the company Borregaard.

The kraft lignin used in the examples is sold under the trade name "Indulin AT" by the company WestVaco.

The mixing step production process is described below.

Mixing Step

The ingredients indicated in Table I were mixed together and kept under stirring at a temperature of 100° C. for 10 min.

From each of the compounds produced as described above a sealant layer was produced, which was subjected to a pressure retention test following puncturing of the tyre on which it was applied. The pressure retention test was performed on the sealant layers both before and after they had undergone an ageing process which entailed keeping them in a stove at 100° C. for three days according to the ISO 188 standard.

In particular, the test was performed on tyres on which a respective sealant layer produced with a respective compound A-C was applied, in the same conditions. Specifically, the sealant layer is extruded directly on the surface of the inner cavity of the tyre.

The tyres, after being inflated with the same internal pressure, were subjected to the same puncturing conditions with subsequent removal of the object used for the puncturing. For each of the tyres that underwent the test, retention of the pressure after 24 h from puncturing (and subsequent removal of the object) was evaluated.

Table II shows the evaluations of the air retention expressed in a form indexed to the result obtained with the sealant layer produced with the compound A before undergoing the ageing process. The higher the indexed value, the better the pressure retention.

TABLE II

|  | A | B | C |
|---|---|---|---|
| Pressure retention | 100 | 95 | 100 |
| Pressure retention after ageing | 80 | 85 | 95 |

From the results of Table II it can be clearly seen that the presence of kraft lignin in the sealant layer (layer relative to the compound of the invention C) not only provides sealing properties comparable to those of the sealant layer commonly used but, at the same time, guarantees the maintenance of said properties also after a period of ageing.

From a comparison between the results for the layer produced with compound B with the results for the layer produced with compound C, it can be seen that it is not the lignin in itself that guarantees the advantages of the present invention; said advantages derive from the exclusive use of kraft lignin, which contributes to giving the present invention the required originality.

The invention claimed is:

1. A compound for a tyre sealant layer comprising at least one polymer base consisting of an essentially saturated polymer and a filler; wherein said filler comprises kraft lignin; said essentially saturated polymer being a polymer produced with less than 15% in moles of diene monomers and is a halobutyl and/or butyl rubber.

2. A compound for a sealant layer according to claim 1, comprising 0.5 to 40 phr of kraft lignin.

3. A compound for a sealant layer according to claim 2, comprising at least 5 phr of kraft lignin.

4. A compound for a sealant layer according to claim 1, wherein the filler comprises carbon black.

5. A compound for a sealant layer according to claim 1, wherein said kraft lignin makes up 0.5 to 100% by weight of the whole filler.

6. A compound for a sealant layer according to claim 5, wherein said kraft lignin makes up at least 10% by weight of the whole filler.

7. A tyre sealant layer produced with the compound according to claim 1.

8. A tyre comprising a sealant layer according to claim 7.

* * * * *